US011986858B2

(12) United States Patent
St-Pierre et al.

(10) Patent No.: US 11,986,858 B2
(45) Date of Patent: May 21, 2024

(54) LUMBER BIN SORTER

(71) Applicant: 9374-4399 QUÉBEC INC., St-Félicien (CA)

(72) Inventors: Isabelle St-Pierre, St-Prime (CA); Jean-Michel St-Pierre, St-Félicien (CA); Joélle St-Pierre, Laval (CA); Michel St-Pierre, St-Prime (CA)

(73) Assignee: 9374-4399 QUEBEC INC., St-Félicien (CA)

( * ) Notice: Subject to any disclaimer, the term of this patent is extended or adjusted under 35 U.S.C. 154(b) by 159 days.

(21) Appl. No.: 17/597,075

(22) PCT Filed: Jul. 3, 2020

(86) PCT No.: PCT/CA2020/050928

§ 371 (c)(1),
(2) Date: Dec. 23, 2021

(87) PCT Pub. No.: WO2021/003562

PCT Pub. Date: Jan. 14, 2021

(65) Prior Publication Data

US 2022/0297161 A1 Sep. 22, 2022

Related U.S. Application Data

(60) Provisional application No. 62/870,982, filed on Jul. 5, 2019.

(51) Int. Cl.
*B07C 5/14* (2006.01)
*B27B 31/08* (2006.01)

(52) U.S. Cl.
CPC ................ *B07C 5/14* (2013.01); *B27B 31/08* (2013.01)

(58) Field of Classification Search
CPC ........................................................ B07C 5/14
See application file for complete search history.

(56) References Cited

U.S. PATENT DOCUMENTS 3,653,506 A 4/1972 Turner et al.
4,219,120 A 8/1980 Rysti
(Continued)

FOREIGN PATENT DOCUMENTS

CA 2914115 A1 6/2017
FI 59039 B * 2/1984

OTHER PUBLICATIONS

International Search Report for International Patent Application No. PCT/CA2020/050928, dated Oct. 30, 2020, 3 pages.
(Continued)

*Primary Examiner* — Michael McCullough
*Assistant Examiner* — Jessica L Burkman
(74) *Attorney, Agent, or Firm* — Neal, Gerber & Eisenberg LLP; Thomas E. Williams

(57) ABSTRACT

A bin sorter for sorting lumber is provided. The bin sorter includes a plurality of bins disposed in a side-by-side configuration. Each bin includes a pair of spaced-apart walls defining a compartment therebetween for receiving lumber. Each compartment has a compartment inlet provided at a top end thereof, and a compartment outlet provided at a bottom end thereof. At least one of the plurality of bins has a support assembly for supporting one or more piles of lumber within the compartment. The support assembly includes a pair of support members having a support base vertically displaceable between the top and bottom ends of the compartment and a support arm connected to the support base and extending within the compartment towards the other support
(Continued)

arm. Each support arm is adapted to support a respective pile of lumber or cooperate with one another to support a single pile of lumber.

19 Claims, 5 Drawing Sheets

(56) References Cited

U.S. PATENT DOCUMENTS

| | | | | |
|---|---|---|---|---|
| 4,815,917 A * | 3/1989 | Newnes | B65G 47/44 | |
| | | | 414/268 | |
| 9,751,113 B2 * | 9/2017 | Hougen | B07C 5/14 | |

OTHER PUBLICATIONS

International Preliminary Report on Patentability for International Patent Application No. PCT/CA2020/050928, dated Jan. 11, 2022, 4 pages.

* cited by examiner

LUMBER BIN SORTER

TECHNICAL FIELD

The technical field generally relates to a lumber bin sorter, and more particularly to a lumber bin sorter adapted to sort full-length and cut lumber in a given bin.

SUMMARY

According to a first aspect, a bin sorter for sorting lumber is provided. The bin sorter includes a plurality of bins disposed in a side-by-side configuration. Each bin includes a pair of spaced-apart walls defining a compartment therebetween for receiving lumber, where each compartment has a compartment inlet provided at a top end thereof, and a compartment outlet provided at a bottom end thereof. The inlet and outlet extend across a width of the bin between opposite sides thereof. At least one of the plurality of bins includes a support assembly for supporting one or more piles of lumber within the compartment. The support assembly has a pair of support members provided on opposite sides of the bin, with each support member having a support base operatively connected to at least one of the spaced-apart walls and being vertically displaceable between the top and bottom ends of the compartment. The support member also includes a support arm connected to the support base and extending within the compartment towards the other support arm, each support arm being adapted to support a respective pile of lumber or cooperate with one another to support a single pile of lumber.

According to a possible embodiment, the bin includes a rail system extending along opposite sides of the first and second walls, and wherein each support base includes rail-engaging elements engageable with the rail system for allowing vertical displacement thereof.

According to a possible embodiment, each support member includes a drive mechanism operable to move the corresponding support base between the top and bottom ends of the compartment.

According to a possible embodiment, each support arm includes support ribs connected thereto and extending in a substantially transverse direction to facilitate supporting the pile of lumber within the compartment.

According to a possible embodiment, the support ribs have a downward angle such that lowering the support arms proximate the bottom end of the compartment allows the pile of lumber to slide off the support ribs and through the compartment outlet.

According to a possible embodiment, the bin sorter further includes at least two diverters positioned above a respective one of the support members proximate the compartment inlet, the diverters being operable between a closed position to prevent access to the compartment, and an opened position to allow lumber to enter the compartment.

According to a possible embodiment, the bin sorter further includes a controller operatively connected to the diverters for operation thereof, the controller being configured to operate the diverters based on measurements and/or quality of incoming lumber pieces.

According to a possible embodiment, the controller is configured to operate the diverters simultaneously or independently from one another.

According to a possible embodiment, the controller is further configured to operate the drive mechanism.

According to another aspect, a support assembly for supporting one or more piles of lumber within a bin of a bin sorter is provided. The support assembly includes a pair of support members provided on opposite sides of the bin, each support member comprising a support base operatively connected to the bin and being vertically displaceable between an uppermost position and a bottommost position; and a support arm connected to the support base and extending within the bin towards the other support arm, each support arm being adapted to support a respective pile of lumber or cooperate with one another to support a single pile of lumber.

According to a possible embodiment, each support base includes rail-engaging elements engageable with a rail system extending along opposite sides of the bin, the rail-engaging elements being adapted to enable vertical displacement of the support member.

According to a possible embodiment, each support member includes a drive mechanism operable to move the corresponding support base between the uppermost position and the bottommost position.

According to a possible embodiment, each support arm includes support ribs connected thereto and extending in a substantially transverse direction to facilitate supporting the pile of lumber within the bin.

According to a possible embodiment, the support ribs have a downward angle such that lowering the support arms proximate a bottom end of the bin allows the pile of lumber to slide off the support ribs.

DETAILED DESCRIPTION

Figure 1:
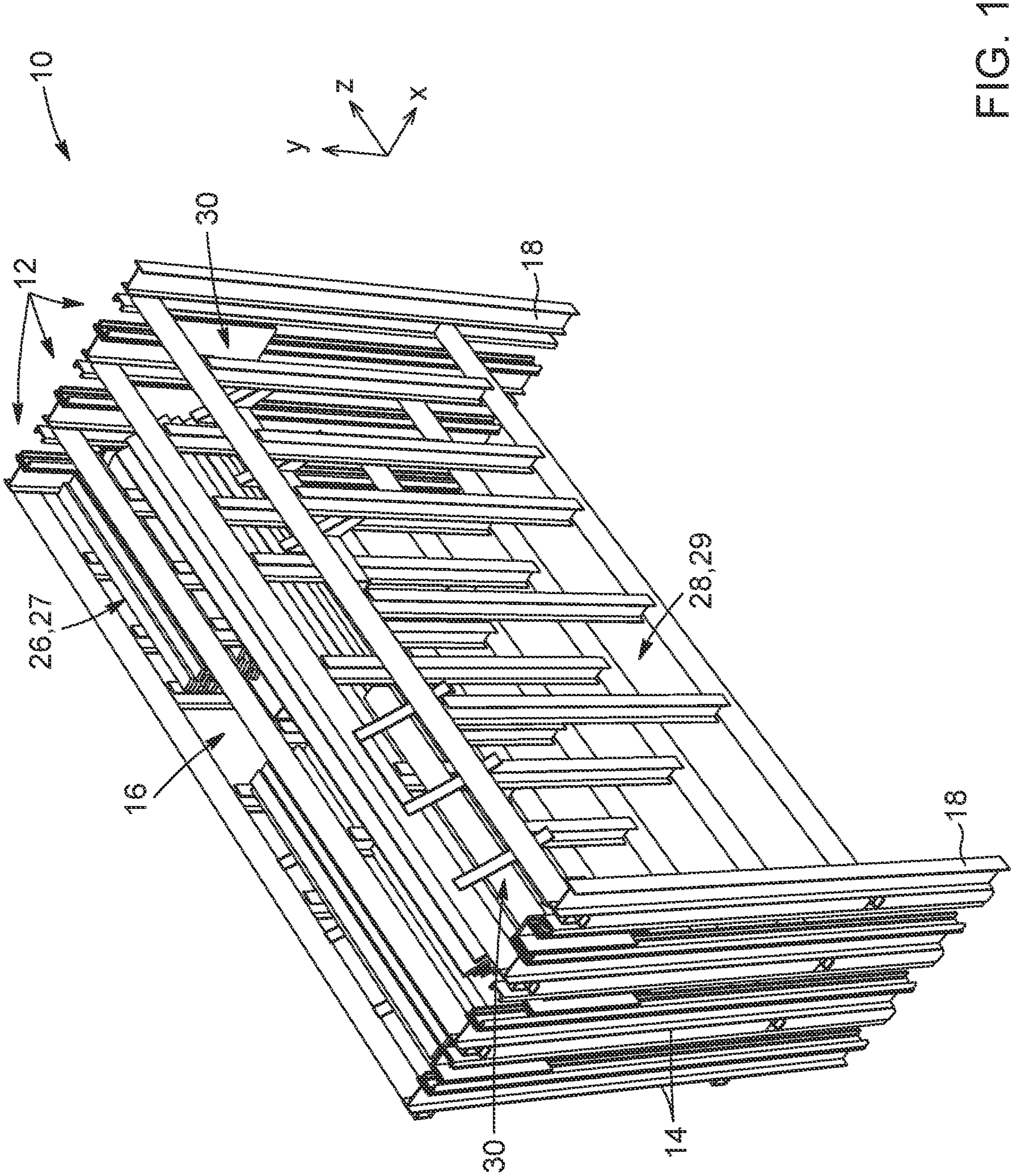
FIG. 1 is a perspective view of a portion of a bin sorter according to an embodiment, showing three bins disposed side-by-side.

In the following description, the same numerical references refer to similar elements. In addition, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

In addition, although the optional configurations as illustrated in the accompanying drawings comprise various components and although the optional configurations of the bin sorter as shown may consist of certain configurations as explained and illustrated herein, not all of these components and configurations are essential and thus should not be taken in their restrictive sense, i.e. should not be taken as to limit the scope of the present disclosure. It is to be understood that other suitable components and cooperations thereinbetween, as well as other suitable configurations may be used for the bin sorter, and corresponding parts, as briefly explained, and as can be easily inferred herefrom, without departing from the scope of the disclosure.

As will be explained below in relation to various embodiments, a bin sorter for sorting lumber is provided. The bin sorter includes a plurality of bins disposed side-by-side to one another and each having a compartment shaped and configured for receiving lumber. It should be understood that, as used herein, the term “bin” refers to a receptacle configured for storing a specified substance or product (in this case lumber). Common bin sorters can include up to one hundred bins or more, although smaller bin sorters can have just five or ten bins. Bin sorters generally include an infeed conveyor installed above the bins for conveying processed lumber towards the bins. Each bin defines a compartment and includes a support assembly operatively mounted within corresponding compartments for catching and supporting lumber dropped from the infeed conveyor.

The lumber can be sorted according to shape, size, overall quality and/or types of wood, among other features. The bin sorter further includes an outfeed conveyor, or discharge conveyor, disposed below the compartments for receiving the piles of lumber, for example when emptying the compartments of the bins. Before describing particular bin sorter embodiments and related components, general comments regarding the process of lumber prior to being sorted will be described below.

The bin sorter can be part of a lumber-processing system configured to effectively process wooden boards prior to them being sorted using the bin sorter. Typical lumber processing systems include a lug chain (i.e., a conveyor or chain having lugs extending therefrom) for conveying wooden boards through one or more units of the system for processing. However, it is appreciated that other types of conveyors are possible, such as conveyors having hooks, or hook-like elements, adapted to transport lumber along a predetermined path. It should be readily understood by a person skilled in the art that lumber being conveyed through a processing system effectively defines a lumber line, i.e., the predetermined path along which each piece of lumber is conveyed. In an exemplary embodiment, the processing system can include one or more cutting stations for cutting the ends of the wooden boards and/or for cutting the boards in two separate pieces. For example, a 20-foot-long piece of wood can be cut to form two 10-foot-long boards, or a 12-foot-long board and an 8-foot-long board, or any other suitable combination of two boards cut from the 20-foot-long board. It is appreciated that cutting the boards in two distinct pieces effectively defines two separate lumber lines along the lug chain for conveying up to two pieces of lumber via the same set of lugs.

The processing system can include a controller for keeping track of lumber dimensions before, during and after the cutting operations. It should be appreciated that the processing line can include a scanning unit to measure and assess the quality of the conveyed lumber. The scanning unit can perform a geometrical and/or qualitative analysis of the lumber to determine color and the presence of knots, among others. It should be noted that multiple scanning units can be used for analyzing respective features of the lumber. The controller can then communicate with the bin sorter in order to appropriately sort the cut boards (i.e., the lumber) in corresponding bins according to size and/or other parameters. Each lumber line can be sorted independently from one another, using any known method and as will become apparent from the following disclosure.

As will be described further below, the support assembly provided within the bins is adapted to support two distinct piles of lumber within the same bin. As such, a wooden board which has been cut into two pieces of lumber can be sorted in the same compartment (i.e., in the same bin). Furthermore, the support assembly advantageously allows for full-length boards (e.g., the 20-foot board) to also be sorted in those same bins. As such, bin sorters having fewer bins can be used since the bins have increased versatility, i.e., they can be used to sort boards of various lengths, in either a single pile (e.g., spanning the entire width of the compartment) or two separate piles.

Referring to FIG. 1, a section of a bin sorter 10 according to a possible embodiment is illustrated. The bin sorter 10 includes a plurality of bins 12 disposed in a side-by-side configuration along the x-axis (as identified in FIG. 1), whereby each bin 12 has a pair of spaced-apart walls 14 defining a compartment 16 therebetween for receiving lumber (L) from an infeed conveyor (not shown), for example. It should be understood that the rear wall of a given bin generally corresponds to the front wall of the following bin, such that two adjacent compartments are defined by a common wall. However, it is appreciated that other configurations are possible.

Figure 2:
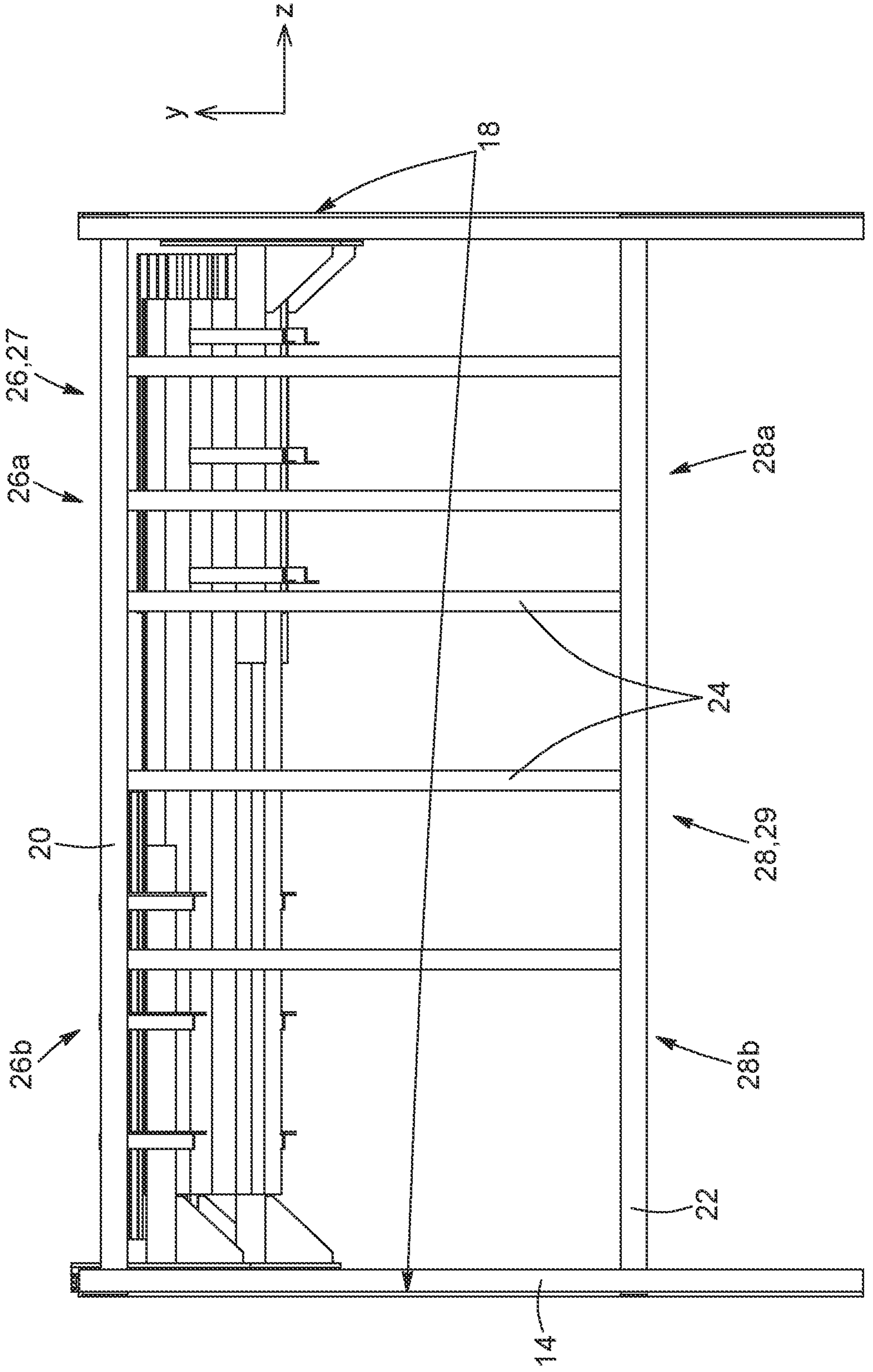
FIG. 2 is a front elevation view of the bin sorter shown in FIG. 1.

Referring to FIG. 2, in addition to FIG. 1, the walls 14 include a frame fixedly connected to a ground surface via columns 18 provided on either side thereof. It should thus be understood that the width of a given bin 12 is defined by the distance between the columns 18 of a same wall forming said bin 12. In this embodiment, the width of each compartment 16 substantially corresponds to the width of the corresponding bin 12, although other configurations are possible. As seen in FIG. 1, the width of each bin extends along the z-axis. The frame of the walls 14 can further include top and bottom cross-beams 20, 22 connected to and extending between opposite columns 18 of a wall 14 (e.g., in the direction of the z-axis). It should be noted that the height of a given bin 12 is defined by the height of the columns 18 of said bin 12, whereby the height of the compartment 16 is defined by the distance between the top and bottom cross-beams 20, 22.

It is appreciated that each bin 12 of the bin sorter 10 can have substantially the same height, but that the width of the bins 12 can vary from one bin to another. For example, a bin sorter 10 can have a first set of bins 12 having a first width (e.g., 20 feet), followed by a second set of bins 12 having a second width (e.g., 12 feet). Additionally, the distance separating the spaced-apart walls 14 (e.g., in the x-axis direction), corresponding to the size of the compartment inlet 26 and/or outlet 28, can be any suitable distance allowing lumber pieces to enter the compartment 16. For example, the size of the inlets and/or outlets 26, 28 can be between about 18 inches and about 50 inches, although it is appreciated that other dimensions are possible. It is further appreciated that the size of the compartment inlet and outlet 26, 28 can vary from one bin 12 to another. However, in the illustrated embodiment, the size of the inlets and outlets are substantially the same across all bins. It should be noted that each bin of the sorter can have substantially the same dimensions (i.e., the same height, width and depth), although it is appreciated that any suitable combination of height, width and depth are possible.

As seen in FIG. 2, the walls 14 can further include a plurality of vertical beams 24 extending between the top and bottom cross-beams 20, 22 to further define the compartment 16 of the bin 12. It is appreciated that the walls 14 can additionally, or alternatively, include horizontal beams and/ or panel sections extending in the area defined between the cross-beams 20, 22 and the columns 18.

In the present embodiment, each compartment 16 has a compartment inlet 26 provided at a top end 27 thereof (e.g., between the top cross-beams 20 of the spaced-apart walls 14) and a compartment outlet 28 provided at a bottom end 29 thereof (e.g., between the bottom cross-beams 22 of the spaced-apart walls 14). It should thus be understood that lumber (L) coming in from the infeed conveyor can be transferred to a given compartment 16 via its compartment inlet 26, and that lumber can exit the compartments 16 from below via corresponding compartment outlets 28. As described above, the infeed conveyor can define two separate lumber lines such that two pieces of lumber can be carried by the same set of lugs. As such, it should be noted that the compartment inlets 26 and outlets 28 respectively include two inlet sections 26*a*, 26*b* and two outlet sections 28*a*, 28*b* associated with corresponding lumber lines. In other words, lumber from the first lumber line is transferred to selected bins 12 via their first inlet section 26*a*, and lumber from the second lumber line is independently transferred to selected bins 12 via their second inlet section 26*b*.

Figure 3:
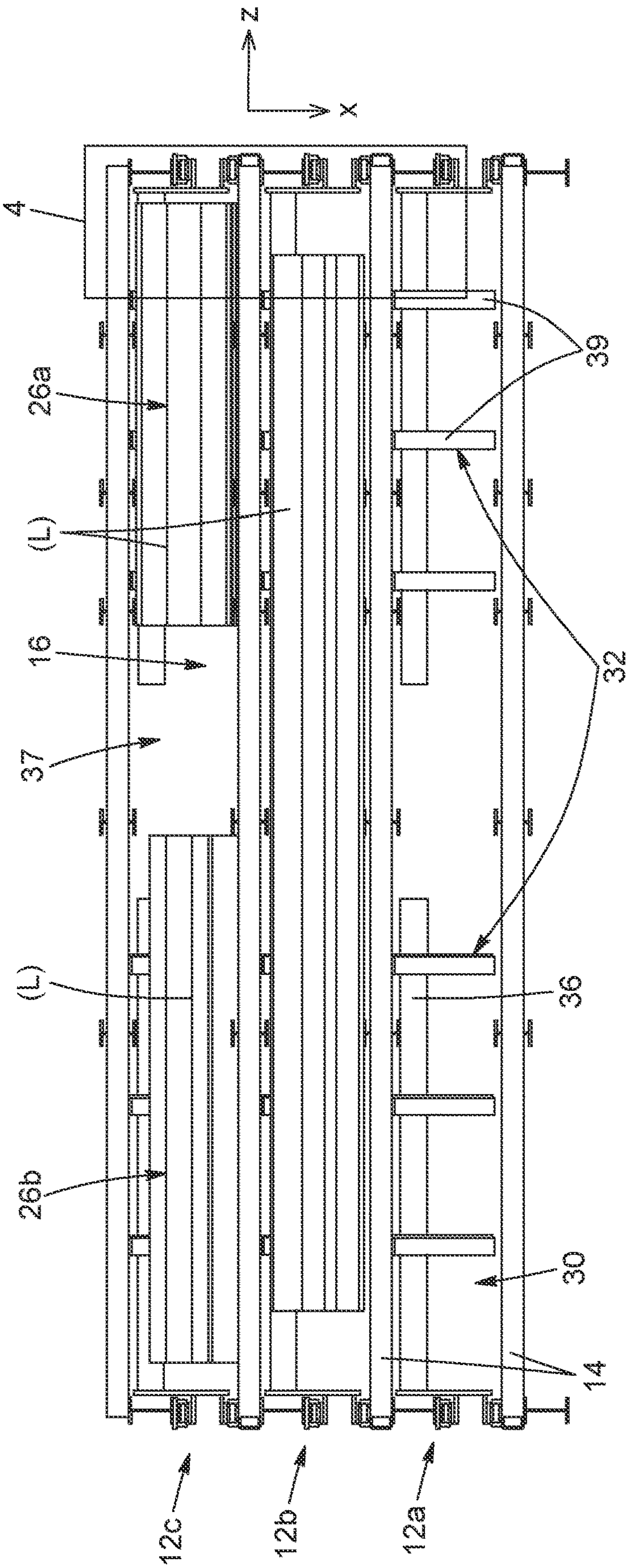
FIG. 3 is a top elevation view of the bin sorter shown in FIG. 1.

In an exemplary embodiment, and with reference to FIG. 3, lumber from a first lumber line can be sorted within bins 12*a*, 12*b* or 12*c* by falling through the corresponding inlet section 26*a*. Similarly, the lumber from a second lumber line (e.g., adjacent the first lumber line on the same lug chain) can be sorted within bins 12*a*, 12*b* or 12*c* by falling through the corresponding inlet section 26*b*. It should be understood that the diverters of a given bin 12 can be opened simultaneously to allow lumbers being carried by a same set of lugs to be sorted in the same bin (i.e., each lumber falling through corresponding inlet section 26*a* and 26*b*). Alternatively, operating the diverters independently allows for lumbers being carried by a same set of lugs to be sorted in two separate bins 12. For example, a first lumber can fall into either bin 12*a*, 12*b* or 12*c* through inlet section 26*a*, while a second lumber (from the same set of lugs) can fall into either bin 12*a*, 12*b* or 12*c* through inlet section 26*b*. It is appreciated that the controller can optimise and choose which bin 12 to open (or keep closed) for allowing the lumber to be sorted efficiently.

It should be noted that the bin sorter 10 includes diverters (not shown) positioned above the bins 12 being operable between a closed position for preventing access to the compartment, and an opened position to allow lumber to transfer from the infeed conveyor to the compartment 16. It is appreciated that when a given diverter is in the closed position, the lumber is carried (via the lugs) to the next bin 12 of the bin sorter 10, and so on, until the selected bin is reached. The diverter of the selected bin 12 can then be opened to allow the piece of lumber to fall within the compartment 16 via the corresponding inlet section. It should be understood that the diverters of a given bin 12 can be independently operable from one another. In other words, the diverter(s) positioned above the first inlet section 26*a* can open and/or close independently from the diverter(s) positioned above the second inlet section 26*b*. In some embodiments, operation of the diverters can be controlled via a controller, although it is appreciated that other configurations are possible.

Referring to FIGS. 1 to 3, the bins 12 include a support assembly 30 for supporting the lumber (L) being dropped within the compartment 16. As will be described further below, the support assembly 30 includes support members 32 adapted to move vertically (e.g., along the y-axis) within the compartment 16 between the top and bottom ends 27, 29 thereof. It is appreciated that when the bin 12 is empty, the support members 32 can be positioned proximate to the top end 27 to reduce the height from which the lumber is dropped into the compartment, and progressively move down within the compartment 16 as the bin 12 fills with lumber (L). As the lumber piles up within the compartment 16, it is appreciated that the vertical beams 24 can cooperate with the support members 32 to prevent the lumber from falling out of the compartment during sorting operations. When the support members 32 descend below the bottom end 29 of the compartment 16 (i.e., below the bottom cross-beam 22), the piled-up lumber (L) exits the compartment 16 via the outlet 28 and is transferred onto the discharge conveyor.

Figure 4:
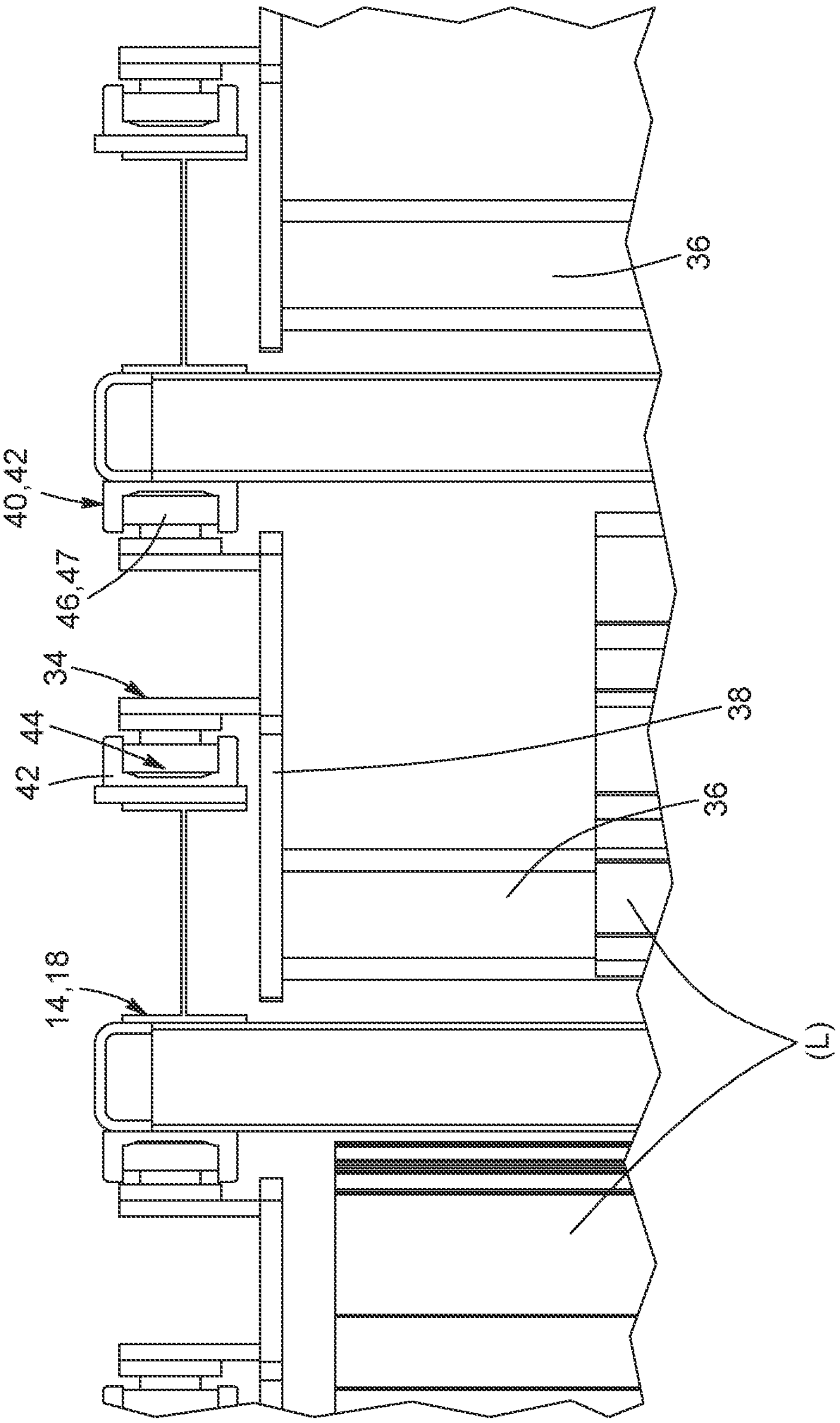
FIG. 4 is an enlarged view of the framed section of FIG. 3, showing a support member connected to a rail system according to an embodiment.
Figure 5:
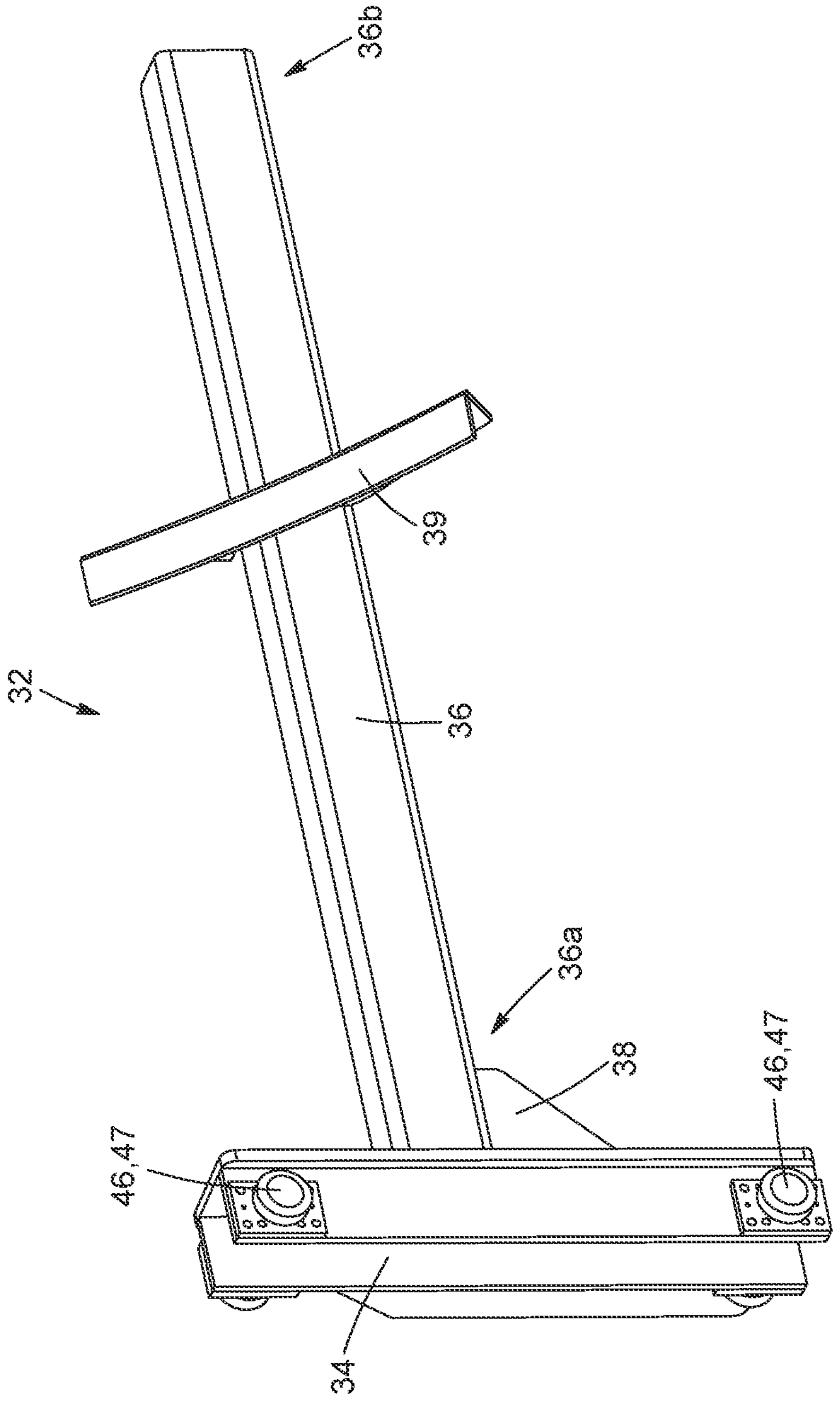
FIG. 5 is a perspective view of a support member, according to one embodiment, showing a support rib connected to a support arm.

Now referring to FIGS. 4 and 5, in addition to FIG. 3, the support assembly 30 illustratively includes a pair of support members 32 provided on opposite sides of the bin 12 (as seen in the empty bin 12*a* of FIG. 3). It is appreciated that each support member 32 can be associated with a respective one of the inlet and outlet sections described above. In some embodiments, each support member 32 can include a support base 34 operatively connected to at least one of the spaced-apart walls 14 to allow vertical displacement of the support base 34. The support members 32 further include a support arm 36 transversely extending from corresponding support bases 34 within the compartment 16. In this embodiment, the support members 32 have a cantilevered configuration whereby the support arms 36 are connected to the support base 34 at a first end 36*a* thereof, with a second end 36*b* being substantially free of any connections. As seen in FIG. 4, the support base 34 and support arm 36 can be further connected together using a bracket or plate 38, or any other suitable connecting element, thus reinforcing the cantilevered configuration of the support member 32. However, it is appreciated that other configurations are possible for connecting the support arm and support base together.

It should be noted that the support arms 36 extend towards one another within the compartment 16 (e.g., along the z-axis) and are shaped and sized so as to define a gap 37 (seen in FIG. 3) between respective second ends thereof. In this embodiment, each support arm 36 is adapted to support a respective pile of lumber (as seen in bin 12*c*) or cooperate with one another to support a single pile of lumber extending across the gap 37 (as seen in bin 12*b*). In order to facilitate supporting piles of lumber within the compartment 16, the support members 32 can include support ribs 39 connected to the support arms 36 in a substantially transverse manner. Therefore, the lumber can extend across multiple support ribs 39 along the support arm 36 to stabilize the pile being formed. It is appreciated that the support members 32 are adapted to cooperate with structural elements of the walls 14 (e.g., vertical beams 24) to form a "basket" in which the lumber (L) can be contained during sorting operations.

Still referring to FIGS. 4 and 5, the support ribs 39 can be connected to the support arm 36 with a downward angle such as to bias the lumber in a selected direction. It is appreciated that, within the compartment 16, the lumber will tend to move towards the wall proximate the lower end of the support ribs 39, and abut against the corresponding vertical beams 24. It should thus be understood that moving the support member 32 below the bottom cross-beam 22 causes the pile of lumber to slide off the angled support ribs 39 and onto the discharge conveyor.

In some embodiments, the ribs 39 can be substantially co-planar with the support arm 36 (i.e., the ribs are not angled) and the support assembly can further include, or cooperate with, additional equipment configured to transfer the lumber from the support arms 36 to the discharge conveyor. Furthermore, the additional equipment can include a mechanism adapted to ease the transfer from the bins to the discharge conveyor (e.g., a soft discharge mechanism). The soft discharge mechanism can include a gate, or other blocking device, adapted to activate/open while the support arms are lowered within the compartment. During operation, the soft discharge mechanism can be completely open once the support arms 36 reach a predetermined position (e.g., below the bottom cross-beam 22) to allow the lumber to be effectively transferred onto the discharge conveyor.

In some embodiments, the bins 12 can include a guiding system 40 to effectively guide the support base 34 during vertical displacement thereof. The guiding system 40 can include rails 42 mounted to and extending along a length of the columns 18. As seen in FIG. 5, the rails 42 can include channels 44 having a C-shaped cross-section and can be mounted opposite one another such that the channels 44 face inwardly, towards each other. In some embodiments, the rails 42 can be further connected to an outer side of the columns 18 to increase rigidity of the guiding system 40, although it is appreciated that other configurations are possible.

In the present embodiment, the support base 34 engages the columns 18, and more specifically the rails 42 of the guiding system 40 and can thus move from proximate the top end 27 of the compartment 16 to below the bottom end 29 thereof. The support base 34 includes rail-engaging elements 46 configured to effectively engage the rails 42, therefore connecting the support member 32 to the walls 14. In this embodiment, the rail-engaging elements 46 include wheels 47 configured to engage the rails 42, and more particularly engage the inward-facing channels 44. In the illustrated embodiment, the support base 34 is provided with two pairs of wheels 47 at either end thereof for engaging the rails 42. However, it is appreciated that other configurations are possible such as two, three, or more than four wheels, for example. Additionally, or alternatively, the rail-engaging elements can include roller bearings shaped and positioned to facilitate vertical displacement of the support base 34 along the guiding system 40.

The support assembly 30 can further include a drive mechanism (not shown) configured to roll, slide or otherwise move the support bases 34 vertically along corresponding rails 42. The drive mechanism can include a pulley system and/or a hydraulic cylinder connected to the support members 32 for engaging vertical movement thereof. However, it is appreciated that any other suitable drive mechanisms, or combination thereof, are possible. For example, one or more motors operatively connected to the wheels 47 of the support base 34 can enable movement of the support base 34.

The piles of lumber (L) can thus be lowered within the compartment 16 during sorting operations as each support base 34 correspondingly descends along the rails 42. As mentioned above, once the lumber is moved below the bottom cross-beam 22 of the walls 14 (i.e., when the support base 34 is moved proximate the bottom end 29 of the compartment 16), the piles of lumber can exit the compartment 16. The controller described above in relation to the diverters can further be configured to control the vertical displacement of the support members 32. Alternatively, the bin sorter can include a second controller for controlling movement of the support assembly 30.

It should be understood that the support members 32 can be moved together (e.g., simultaneously) or independently from one another. For example, when each support member 32 is respectively supporting a pile of lumber, the support members 32 can be moved independently such that the piles can be transferred to the discharge conveyor without affecting the other pile. Moreover, if the support members 32 are cooperating to support a single pile of lumber, the support members 32 are preferably moved simultaneously to maintain the pile substantially stable (i.e., leveled) thereon. As seen in FIG. 2, the open space defined below the bottom cross-beam 22 of the walls 14 allows for both cut lumber and full-length lumber to be transferred onto the discharge conveyor and conveyed further down the processing line. It should be understood that having one or more additional columns 18 positioned substantially in the center of the bin 12 (e.g., for increased support) can block lumber, such as full-length lumber, from being conveyed via the discharge conveyor.

It will be appreciated from the foregoing disclosure that there is provided a lumber bin sorter that, by virtue of its design and components, as explained herein, and the particular configurations thereof, advantageously enables to carry out sorting operations of full-length lumber and cut lumber using the same bins. The bins and corresponding support assembly allow for sorting of lumber in a more efficient, more reliable, more adjustable, more versatile, more adaptable and/or more desirable manner, compared to what is possible with respect to other known lumber bin sorters and/or methods. Among other advantages, the support assembly and guiding system are adapted to be retrofitted onto existing bin sorter structures (e.g., HSS beams, I-beams or any other suitable structural elements). It should be noted that the support assembly and guiding system can be retrofitted to existing bin sorters having mill-specific configurations with respect to the size of the bins (e.g., a combinations of height/width/depth), to the mechanical systems, to the number of bins, to the level of automation, among others.

Of course, and as can be easily understood by a person skilled in the art, the scope of the present invention should not be limited by the possible embodiments set forth in the examples, but should be given the broadest interpretation consistent with the description as a whole.

Furthermore, although preferred embodiments of the present invention have been briefly described herein and illustrated in the accompanying drawings, it is to be understood that the invention is not limited to these embodiments and that various changes and modifications could be made without departing from the scope and spirit of the present invention, as also apparent to a person skilled in the art.

The invention claimed is:

1. A bin sorter for sorting lumber, the bin sorter comprising:

a plurality of bins disposed in a side-by-side configuration, each bin comprising:

a pair of spaced-apart walls defining a compartment therebetween adapted to receive lumber, each compartment including a compartment inlet provided at a top end thereof, and a compartment outlet provided at a bottom end thereof, the compartment inlet and the compartment outlet extending along a length of the compartment between a first side and a second side thereof, at least one of the plurality of bins comprising a support assembly comprising:

a first support member having a first support base operatively connected to at least one of the spaced-apart walls proximate the first side of the compartment, and a first support arm connected to the first support base and extending within the compartment; and a second support member having a second support base operatively connected to at least one of the spaced-apart walls proximate the second side of the compartment, and a second support arm connected to the second support base and extending within the compartment, wherein each support member is vertically displaceable between the top end and the bottom end of the compartment, and the first support arm and the second support arm extend towards one another within the compartment and are adapted to support respective piles of lumber or cooperate with one another to support a single pile of lumber.

2. The bin sorter according to claim 1, wherein the bin comprises a rail system extending along the first side and the second side of the at least one of the spaced-apart walls, and wherein each one of the first and second support bases comprises rail-engaging elements engageable with the rail system and operable to enable vertical displacement of each one of the first and second support members.

3. The bin sorter according to claim 1, wherein each one of the first and second support members comprises support ribs connected to respective ones of the first and second support arms, the support ribs extending in a substantially transverse direction relative to the first and second support arms.

4. The bin sorter according to claim 3, wherein the support ribs have a downward angle such that lowering the support arms proximate the bottom end of the compartment allows the pile of lumber to slide off the support ribs and through the compartment outlet.

5. The bin sorter according to claim 1, wherein the first support member and the second support member are vertically movable between the top end and the bottom end of the compartment independently from one another.

6. The bin sorter according to claim 1, wherein the first support member and the second support member are vertically movable between the top end and the bottom end of the compartment synchronously.

7. A support assembly for supporting one or more piles of lumber within a bin of a bin sorter, the support assembly comprising:

a pair of support members provided on opposite sides of the bin, each support member comprising:

a support base operatively connected to the bin and being vertically displaceable between an uppermost position and a bottommost position; and a support arm connected to the support base and extending within the bin, wherein each support arm extends from respective sides of the bin towards each other, wherein each support arm is configured to support respective piles of lumber within the bin or cooperate with one another to support a single pile of lumber.

8. The support assembly according to claim 7, wherein each support base comprises rail-engaging elements engageable with a rail system extending along the opposite sides of the bin, the rail-engaging elements being operable to enable vertical displacement of the corresponding support member.

9. The support assembly according to claim 7, wherein the support members are configured to be retrofitted onto an existing bin sorter having mill-specific configurations.

10. The support assembly according to claim 7, wherein each support member comprises support ribs connected to respective support arms and extending in a substantially transverse direction relative to the support arm.

11. The support assembly according to claim 10, wherein the support ribs have a downward angle such that lowering the support base proximate the bottommost position allows the pile of lumber to slide off the support ribs.

12. A bin sorter for sorting lumber, comprising:

a bin disposed in a side-by-side configuration relative to additional bins, the bin comprising:

first and second walls defining a compartment therebetween, each one of the first and second walls comprising:

a frame having top and bottom horizontal cross-beams and one or more vertical beams extending between the top and bottom horizontal cross-beams; and first and second columns connected to opposite sides of the frame, each one of the first and second columns being configured to engage a ground surface;

a support assembly comprising:

a first support member having a first support base operatively connected to the first column, and a first support arm connected to and extending from the first support base at least partway between the first and second columns, the first support arm having a free end; and a second support member having a second support base operatively connected to the second column, and a second support arm connected to and extending from the second support base at least partway between the first and second columns, the second support arm having a free end.

13. The bin sorter according to claim 12, wherein the first support member is vertically movable along the first column at least between the top and bottom horizontal cross-beams, and wherein the second support member is vertically movable along the second column at least between the top and bottom horizontal cross-beams.

14. The bin sorter according to claim 13, wherein the first support member and the second support member are vertically movable synchronously with one another or independently from one another.

15. The bin sorter according to claim 12, wherein the first column, the second column and the bottom horizontal cross-beam define an outlet section therebetween, the outlet section being unobstructed.

16. The bin sorter according to claim 12, wherein the free end of the first support arm is spaced from the free end of the second support arm thereby defining a gap therebetween.

17. The bin sorter according to claim 16, wherein the first support arm has a first length, and the second support arm has a second length, the first length is equal to the second length.

18. The bin sorter according to claim 16, wherein the gap is unobstructed to enable elongated pieces of lumber to extend across the gap and be supported by the first and second support members simultaneously.

19. The bin sorter according to claim 12, wherein the first and second support arms are elongated and generally aligned with one another.

* * * * *